US006541977B2

(12) United States Patent
Sneed et al.

(10) Patent No.: US 6,541,977 B2
(45) Date of Patent: Apr. 1, 2003

(54) ELECTRONIC WATER LINE TRACER (75) Inventors: James Sneed, Dallas, TX (US); Rainer Fink, Cypress, TX (US); James Ochoa, Bryan, TX (US)

(73) Assignee: Pulsar 2000, Inc., Dallas, TX (US)

( * ) Notice: Subject to any disclaimer, the term of this patent is extended or adjusted under 35 U.S.C. 154(b) by 0 days.

(21) Appl. No.: 09/782,728

(22) Filed: Feb. 13, 2001

(65) Prior Publication Data

US 2002/0153905 A1 Oct. 24, 2002

(51) Int. Cl.[7] .................................................. G01V 3/08
(52) U.S. Cl. ...................................................... 324/326
(58) Field of Search ........................ 324/67, 326, 329, 324/345, 557, 559, 327, 66

(56) References Cited

U.S. PATENT DOCUMENTS

| 3,988,663 | A | | 10/1976 | Slough et al. ................... 324/3 |
| 3,990,003 | A | | 11/1976 | Agee, Jr. et al. ............... 324/52 |
| 3,995,114 | A | * | 11/1976 | Marschinke ................. 179/1 A |
| 4,289,142 | A | * | 9/1981 | Kearns ......................... 128/716 |
| 4,387,337 | A | | 6/1983 | Beeman ......................... 324/52 |
| 4,458,204 | A | | 7/1984 | Weber .......................... 324/326 |
| 4,609,994 | A | * | 9/1986 | Bassim et al. ............... 364/551 |
| 4,818,944 | A | | 4/1989 | Rippingale ................... 324/326 |
| 5,006,810 | A | * | 4/1991 | Popescu ........................ 328/167 |
| 5,109,200 | A | * | 4/1992 | Dushane et al. ............. 324/508 |
| 5,194,812 | A | | 3/1993 | Yokoi .......................... 324/326 |
| 5,444,364 | A | * | 8/1995 | Satterwhite et al. ........... 324/67 |
| 5,554,934 | A | | 9/1996 | Ward et al. .................. 324/326 |
| 5,617,031 | A | | 4/1997 | Tuttle .......................... 324/326 |
| 5,644,237 | A | * | 7/1997 | Eslamblochi et al. ........ 324/326 |
| 5,714,885 | A | * | 2/1998 | Lulham ........................ 324/529 |
| 5,802,446 | A | * | 9/1998 | Giorgi et al. .................. 455/69 |
| 5,812,006 | A | * | 9/1998 | Teggatz et al. .............. 327/309 |
| 5,994,904 | A | * | 11/1999 | Eslambolchi et al. ........ 324/326 |
| 6,127,868 | A | * | 11/2000 | Phillips ....................... 327/205 |
| 6,198,306 | B1 | * | 3/2001 | Sessions ........................ 325/83 |
| 6,326,790 | B1 | * | 12/2001 | Ott et al. ..................... 324/327 |

* cited by examiner

Primary Examiner—Christine Oda
Assistant Examiner—Etienne P LeRoux
(74) Attorney, Agent, or Firm—Rudolf & Siegesmund (57) ABSTRACT A line tracer is disclosed comprising a transmitter for generating a signal in a target pipe, a cable set, a detector for amplifying the signal and filtering unwanted electronic noise, and a method for employing the line tracer. The transmitter further comprises a transmitter circuit board having a pulse generation circuit, a tone generation circuit and a transformer drive circuit. The transmitter circuit board is tuned to provide a pulse frequency of approximately 1.3 Hz and a tone rate of approximately 600 Hz. The detector further comprises a detector circuit board having a difference amplifier, a first high pass filter, a second high pass filter, a non-inverting amplifier, and a sensitivity meter. The detector circuit board is designed to amplify the detected signal and to achieve an attenuation of frequencies from 0 Hz to 400 Hz that is 80 dB/decade. The detector provides a visual indicator of signal strength.

24 Claims, 8 Drawing Sheets

ELECTRONIC WATER LINE TRACER

TECHNICAL FIELD

The present invention generally relates to a system for use in determining the location of hidden water pipes and, more particularly, to a system having a transmitter for generating a signal in a target pipe, and to a detector for inductively picking up the signal, amplifying the signal and filtering unwanted electronic noise.

BACKGROUND OF THE INVENTION

Water, gas and fuel lines are commonly buried beneath the ground. In addition, water, gas and fuel pipes travel beneath or within the foundations and within the walls of buildings. When a leak or partial break in a line occurs, it is necessary to know the location of the line as a first step in determining the location of the leak. A further problem arises because there may be multiple pipes located near each other, and a need exists for a way to determine the location of the particular pipe that requires repair. An additional reason for a line tracing system is that when drilling through the earth, a building wall or foundation, it is desirable to know the location of lines to avoid causing accidental breaks.

A line tracing system operates on the principle of inducing an electromagnetic field in a segment of line (the target line), and then detecting this magnetic field using wound coil of wire. A line tracing system is composed of two major components: a transmitter and a detector. The transmitter is the part of the system used to energize a segment of a water line. The detector senses the energized line and creates an audible tone indicating that the energized line has been detected. An operator passes the detector back and forth over the area to be searched, first to locate the signal and then to determine the location of the strongest signal. The transmitter may send the signal in pulses to aid in distinguishing the transmitter signal from other signals. When operated together, the transmitter and detector form a system that can be effectively used for locating water lines hidden behind walls, within concrete foundations or underground.

A target line may be located near electrical lines which emit electromagnetic signals in the 60 Hz range. In addition, a target line may have branch lines such as water lines to a kitchen, one or more bathrooms and a garage. Target lines passing through concrete foundations may contact or be located near steel rebar. Therefore, a need exists for a line tracer system that can distinguish the target line from branch lines, electrical lines and metal objects. A need exists for a line tracing transmitter with a tone rate that is significantly faster than electrical power signals. A further need exists for a line tracer transmitter than can pulse sufficiently fast so that an operator will not pass over a target line between pulses. In addition, a need exists for a line tracer detector that can filter unwanted electrical noise, provide a visual indication of signal strength, and be physically designed to help the operator search efficiently.

SUMMARY OF THE INVENTION

The invention that meets the needs identified above is a line tracer comprising a transmitter for generating a signal in a target pipe, a cable set, a detector for amplifying the signal and filtering unwanted electronic noise, and a method for employing the line tracer. The transmitter further comprises a transmitter circuit board having a pulse generation circuit, a tone generation circuit and a transformer drive circuit. The transmitter circuit board is tuned to provide a pulse frequency of approximately 1.3 Hz and a tone rate of approximately 600 Hz. The detector further comprises a detector circuit board having a difference amplifier, a first high pass filter, a second high pass filter, a non-inverting amplifier, and a sensitivity meter. The detector circuit board is designed to amplify the detected signal and to achieve an attenuation of frequencies from 0 Hz to 400 Hz that is 80 dB/decade. The detector provides a visual indicator of signal strength.

DETAILED DESCRIPTION OF THE PREFERRED EMBODIMENT

Figure 1:
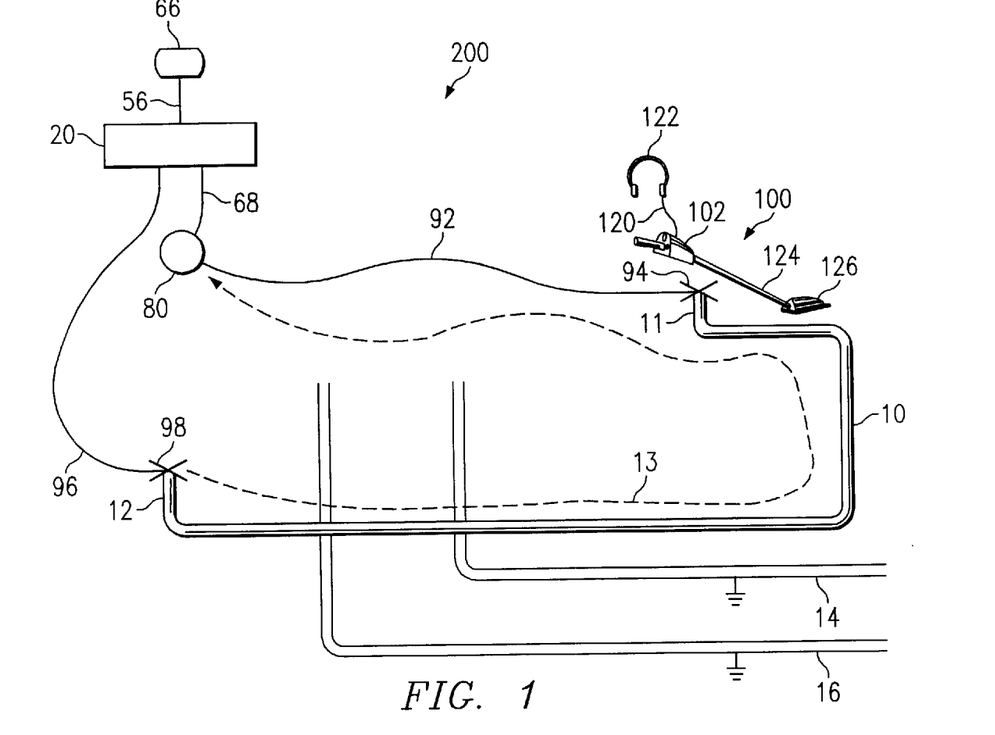
FIG. 1 is a depiction of a closed loop line tracer system.

FIG. 1 depicts line tracer 200 having transmitter 20, first cable 96, second cable 68 third cable reel 80 and detector 100. Transmitter 20 has recharge accessory 66 and second cable 68. Second cable 68 is connected to cable reel 80. Third cable 92 is connected to cable reel 80 and has third cable clamp 94. First cable 96 has first cable clamp 98. Detector 100 has upper housing 102, tube 124 and lower housing 126. FIG. 1 also depicts target line 10 and first non-target line 14 and second non-target line 16. As used herein, the term line tracer shall mean a transmitter, a detector and at least two cables, each having a clamp, for connecting the transmitter to a target line. Target line as used herein shall mean a segment of a pipe, the location of which is to be identified using the line tracer, having a first end accessible for affixing a clamp and a second end accessible for affixing a clamp, said first end and said second end defining the segment of line to be traced. First non-target line 14 and second non-target line 16 may be connected directly to target line 10, or first non-target line 14 and second non-target line may be separate but with their exterior surface in direct contact to the exterior surface of target line 10.

When deployed, line tracer 200 will have transmitter 20 connected to second end 12 of target line 10 by first cable 96, and connected to cable reel 80 by second cable 68. Third cable 92 is connected to cable reel 80, and will also be connected to first end 11 of target line 10 third cable clamp 94. As used herein the term clamp shall mean opposing jaws with serrated teeth made of conductive material such as copper or copper alloy, hinged together and spring driven so that the opposing jaws will close unless forced apart by pressure applied to insulated handles. An example of suitable clamps are the alligator clips on standard automotive jumper cables. FIG. 1 shows that a closed circuit is formed between transmitter 20 and the segment of target pipe (between first end 11 and second end 12) to which first cable clamp 98 and third cable clamp 94 are attached. First path 13 depicts the signal path through target line 10.

Figure 1A:
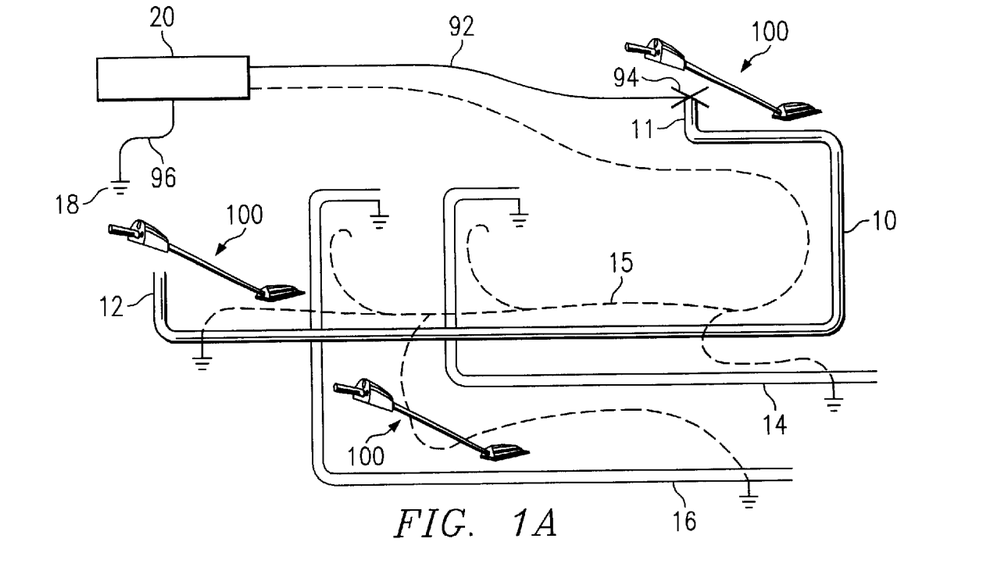
FIG. 1A is a depiction of a line tracer system that uses earth ground as a current return.

FIG. 1a depicts target line 10, first non-target line 14 and second non-target line 16. Third cable 92 is connected directly to transmitter 20 and to first end 11 of target line 10. However, first cable 96 is connected to ground 18. When a closed circuit is not formed by connecting transmitter 20 to both ends of target line 10, it is not only more difficult to detect target line 10 but it is difficult to distinguish target line 10 from first non-target line 14 and second non-target line 16. FIG. 1a depicts the situation where a closed circuit is not formed and a signal transmitted through target line 10 will be detectable on non target line 14 and non target line 16. Line tracer 200 will function in a non-closed circuit mode but it may be difficult to distinguish between the target and non target lines. Second path 15 depicts the signal path when first cable 96 is grounded rather than being connected to the target line.

Figure 2A:
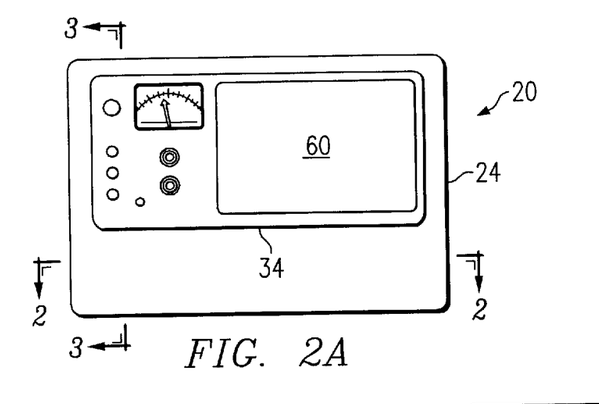
FIG. 2A is a top view of the transmitter with lid removed showing the control panel.
Figure 2B:
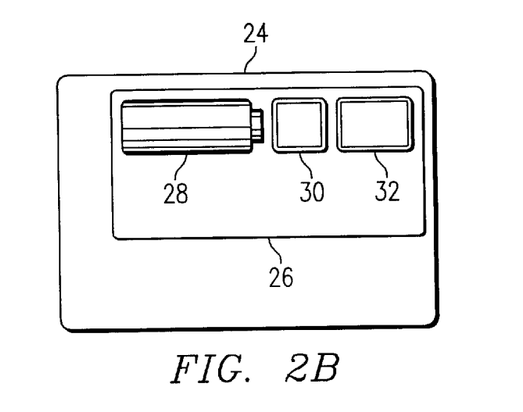
FIG. 2B is an interior view of the transmitter showing the mounting board with attachments.
Figure 2C:
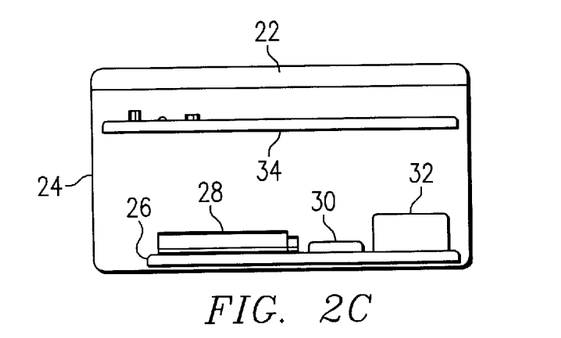
FIG. 2C is an interior view of the transmitter along cut line 2—2 of FIG. 2A.
Figure 2D:
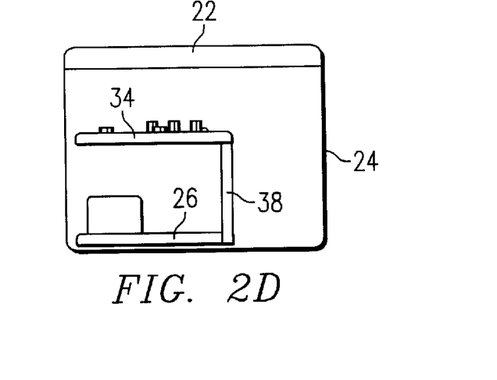
FIG. 2D is an interior side view of the transmitter along cut line 3—3 of FIG. 2A.

FIG. 2A depicts a top view of transmitter 30 viewed from above with lid 22 (See FIG. 2C) removed so that control panel 34 can be seen inside housing 24. FIG. 2B is a top view of housing 24 with both lid 22 and control panel 34 removed. FIG. 2B depicts mounting board 26 removably and fixedly engaged to housing 24. Mounting board 26 has battery 28, circuit board 30 and transformer 32 removably and electrically connected to mounting board 26. FIG. 2C depicts a side view of transmitter 20 through cut line 2—2. Lid 22 is shown affixed to housing 24. Control panel 34 is shown positioned above mounting board 26. FIG. 2D is a side view of transmitter 20 through cut line 3—3 showing control panel 34 positioned above mounting board 26. Control panel support 38 is fixedly engaged to control panel 34 to both provide support to control panel 34 and to define a storage space within housing 24.

Figure 2E:
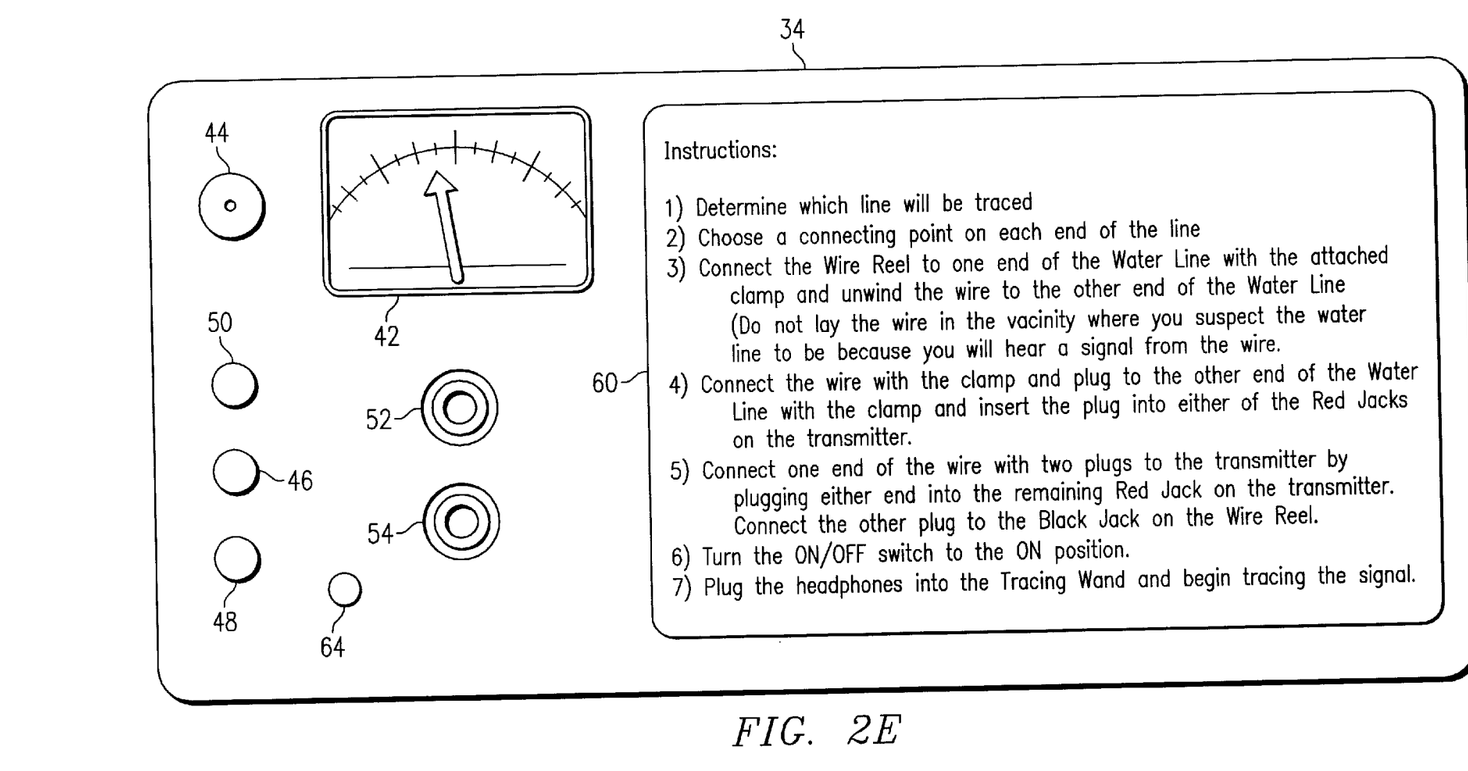
FIG. 2E is an top view of the transmitter control panel.

FIG. 2E is a detailed view of control panel 34. Control panel 34 has instruction 60, battery strength indicator 42, charger port 44, pulse/tone switch 46, on/off switch 48 and high/low switch 50. Control panel 34 also has Light Emitting Diode (LED) 64, first control jack 52 and second control jack 54. LED 64 provides a readily observable indication of connectivity. Battery strength indicator 42 indicates when recharging is necessary.

Transmitter 20 has two modes of amplitude based operation, referred to as high and low. Selection of high or low modes is be made by moving high/low switch 50 to either a high or a low position thereby allowing an operator to control the current pulse amplitude generated by transmitter 20. Transmitter 20 has two modes of frequency based operation, referred to as pulse mode and tone mode. Mode selection is made by moving pulse/tone switch 46 to the pulse or the tone position. On/off switch 48 allows the power supply of battery 28 to be disconnected from mounting board 26. First control jack 52 and second control jack 54 are used for connecting first cable 96 and second cable 68 to transmitter 20. Recharge accessory 66 may be connected to charger port 44 of transmitter 20 by accessory cable 56 (FIG. 1). Instruction 60 provides a readily accessible summary of the method of employing line tracer 200. Circuit board 30 generates a tone or pulse signal. The tone is a continuous AC (alternating-current) signal that oscillates at a fixed frequency in the audible range. The pulse signal causes the tone signal to be induced on target line 10 in brief bursts. The purpose of the pulse mode is to assist the operator in distinguishing the tone signal from other signals that may be present on or near the target line.

Transmitter, as used herein, shall mean a housing having a removable lid, a mounting board, a battery, a transformer, a transmitter circuit board, a control panel, a control panel support and a storage space between the housing and the control panel support. The housing and removable lid of the transmitter shall be made of suitable non-conducting material and shall provide a substantially waterproof enclosure when the lid is affixed to the housing.

Transmitter circuit board as used herein shall mean a circuit board having a pulse circuit, a tone circuit and a switch device where the transmitter circuit board is tuned to generate a pulse signal of at least 0.80 Hz and a tone rate of at least 450 Hz. As used herein, the term transmitter circuit board does not include a transmitter circuit board tuned to pulse at 0.79 Hz or lower or to generate a tone rate of 449 Hz or lower. As used herein, switching devices shall mean the N-channel MOSFET of the preferred embodiment and shall also include, without limitation, other similar switching devices such as a P-channel MOSFET, a depletion mode MOSFET, a Junction Field Effect Transistor (JFET) or a single-pole double throw relay. As used herein, the term switching device shall not include Bipolar Junction Transistors.

As used herein, tuning or tuned means to apply standard design practices in selecting capacitors and resistors to cause components to provide the desired results.

Figure 3:
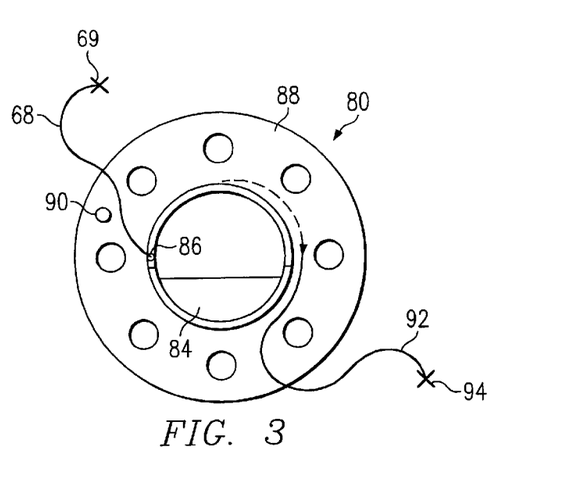
FIG. 3 is a side view of the cable reel.

FIG. 3 depicts cable reel 80 having third cable 92 wound inside cable spool 88 and around inner handle 84. Second cable 68 is attached to cable reel jack 86 and has second cable jack 69 for insertion in either first control jack 52 or second control jack 54 of transmitter 20. Cable reel 80 has cable spool 88 affixed to inner handle 84. Outer handle 90 is affixed to cable spool 88. When second cable 68 is connected to transmitter 20, second cable 68 is plugged into cable reel jack 86, transmitter 20 is connected to second end 12 of target line 10 by first cable 96, and third cable 92 is affixed to first end 11 of target line 10, a closed loop current is forced through target pipe 10.

Figure 4A:
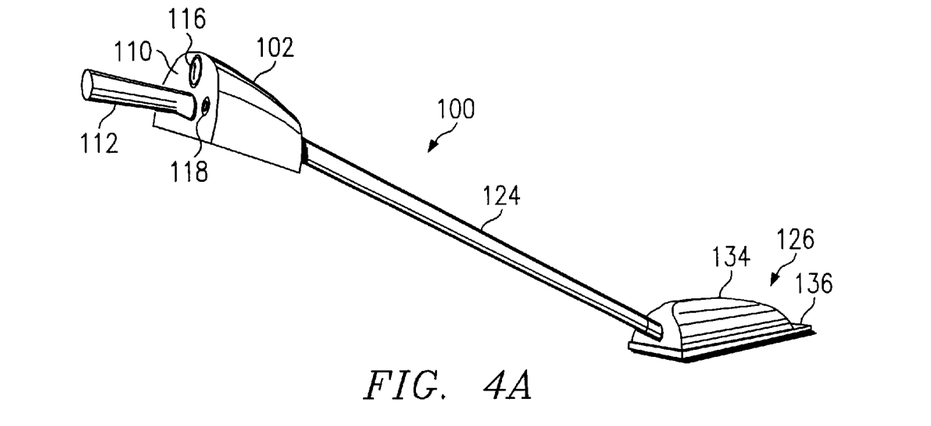
FIG. 4A is a right side perspective view of the detector.
Figure 4B:
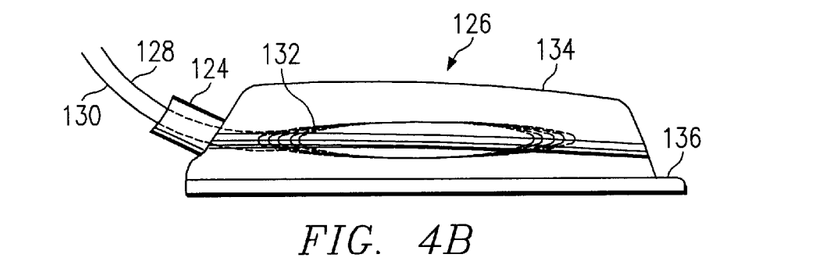
FIG. 4B is a side view of the detector lower housing showing the enclosed induction coil.
Figure 4C:
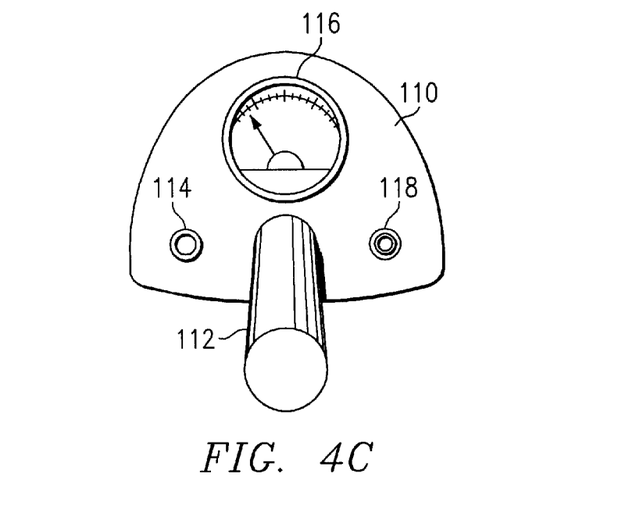
FIG. 4C is a top perspective view of the face of the upper housing of the detector.

Referring to FIGS. 4A to 4C, detector 100 has two modes of operation, visual and auditory. Both modes are active when detector 100 is in operation. Detector 100 has detector lower housing 126, tube 124, detector upper housing 102 and handle 112. Gauge 116 is positioned above handle 112 on face 110 of detector upper housing 102. Female RCA jack 118 is shown to the right of handle 112 on face 110. FIG. 4B depicts a side view of detector lower housing 126 showing top 134, base 136 and tube 124. First wire 128 and second wire 130 are connected to coil 132 positioned above base 136. First wire 128 and second wire 130 travel through tube 124 to detector upper housing 102. FIG. 4C depicts face 110 of detector upper housing 102. In addition to gauge 116 and female RCA jack 118, volume knob 114 is shown to the left of handle 112. Female RCA jack 118 received male RCA jack (not shown) attached to headphones 122 (see FIG. 1). Volume knob 114 allows control of the detector 100 sensitivity and amplification by detector circuit board (not shown) inside upper housing 102. The detector circuit board is electrically connected to coil 132 by first wire 128 and second wire 130. Gauge 116 is a voltage sensitive meter that allows observation of the signal strength in addition to the audible signal heard through headphones 122. Deflection of the needle on gauge 116 indicates proximity to target line 10.

As used herein, detector shall mean a device for locating and measuring a signal from a transmitter in a target line, the device having a lower housing, an upper housing and a tube connecting the lower housing and upper housing, an inductive coil in the lower housing electrically connected to a detector circuit board in the upper housing by a pair of wires passing through the tube, and a handle connected to the upper housing so that the gauge is visible to the operator when the inductive coil is approximately parallel to the ground.

As used herein, upper housing shall mean an enclosure having a face containing the following, each of which is connected to a circuit board within the upper housing: a gauge, an amplitude control knob and a jack for receiving headphones.

As used herein, the term lower housing shall mean a base and a top, together having a generally pointed front, a generally flat rear, sides that extend from the generally flat rear to the generally pointed front, and a top that curves down to conform to the pointed front so that the shape of the lower housing resembles a clothing iron and facilitates passage of the lower housing through high grass, weeds or undergrowth.

The basic operating principle of the detector circuit board is sensing, by coil 132, an electromagnetic field induced in target line 10 by transmitter 20 and amplifying this signal to create an audible tone via headphones 122 and signal strength indication via gauge 116. The detector circuit board (not shown) amplifies the output from coil 132 until the output is capable of producing an audible signal at headphones 122.

As used herein, detector circuit board shall mean a circuit board having a differential amplifier, a non-inverting amplifier and two cascaded high pass filters tuned to achieve an attenuation of approximately 80 dB/decade in frequencies from 0 Hz to 400 Hz. As used herein, the term high pass filter shall include without limitation second order Butterworth filters, Chebyshev high pass filter, narrow band pass filters, wide band pass filters, or noise-band reject filters. As used herein, an inverting amplifier may be used in place of a non-inverting amplifier.

Figure 5:
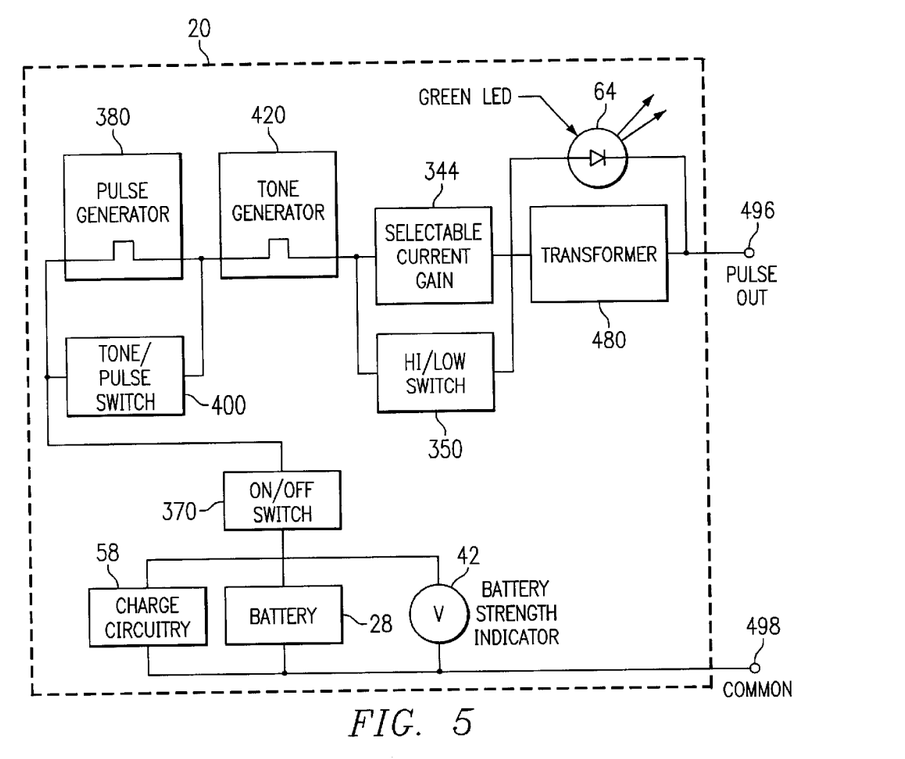
FIG. 5 is a functional block diagram of the transmitter components.

FIG. 5 depicts a block diagram of transmitter 20. On/off electrical switch 370 connects to charge circuitry 58, battery 28, and battery strength indicator 42 to tone/pulse electrical switch 400 and pulse generator 380. Tone/pulse electrical switch 400 is connected to pulse generator 380. High/low electrical switch 350 is connected to selectable current gain 344 and to Light Emitting Diode (LED) 64. Transformer 480 (the electrical equivalent of transformer 48 in FIG. 2B–2D) is connected to selectable current gain 114 and pulse out 496. Transformer 480 provides electrical isolation. In parallel to said transformer, LED 64 provides an indication of connectivity to the target pipe.

Figure 6:
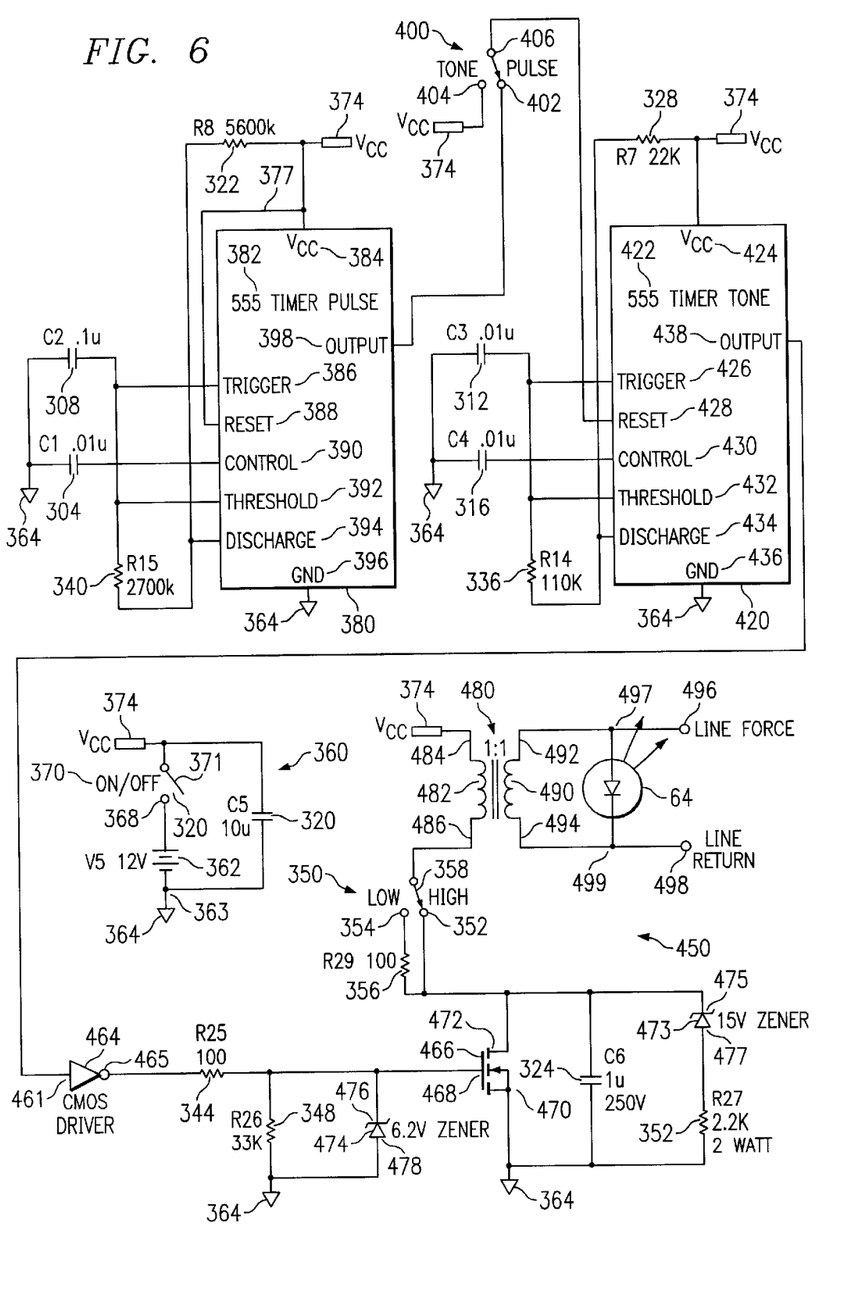
FIG. 6 is a schematic of the transmitter circuit board of the present invention.

Referring to FIG. 6, Transmitter Circuit Board (TCB) 300 has five sections: circuit voltage source 360, pulse generation circuit 380, tone generation circuit 420, transformer drive circuit 450, and transformer 480.

Circuit voltage source 360 is implemented with 12-volt battery 362. Capacitor C5 320 is connected to battery positive terminal 368 through on/off switch 370 and to battery negative terminal 363. Battery positive terminal 368 is connected to on/off switch first terminal 372.

Pulse generation circuit 380 is implemented using first pulsate 555 timer 382 configured as an astable oscillator tuned to 1.3 Hz and has seven inputs and one output. First input Vcc 384 is connected directly to Vcc 374. First input trigger 386 is connected to GND 364 through Capacitor C2 308. First input reset 388 is connected to Vcc 374. First input control 390 is connected to GND 364 through Capacitor C1 304. First input threshold 392 is connected directly to first input trigger 386. First input threshold 392 is also connected to first input discharge 394 through resistor R15 340. First input discharge 394 is connected to Vcc 374 through resistor R8 322. First input GND 396 is connected directly to GND 364.

First signal output 398 is connected to tone/pulse switch first terminal 402. Tone pulsate switch second terminal 404 is connected to Vcc 374. Tone generation circuit 420 is implemented using second pulsate 555 timer 422 configured as an astable oscillator tuned to 600 Hz and has seven inputs and one output. Second input Vcc 424 is connected directly to Vcc 374. Second input trigger 426 is connected to GND 364 through capacitor C3 312. Second input reset 428 is connected to tone/pulse switch pole 406. Second input control 430 is connected to GND 364 through capacitor C4 316. Second input threshold 432 is connected directly to second input trigger 426. Second input threshold 432 is also connected to second input discharge 434 through resistor R14 336. Second input discharge 434 is connected to Vcc 374 through resistor R7 328. Second input GND 436 is connected directly to GND 364. Second signal output 438 is connected to CMOS driver input 461. Transformer drive circuit 450 begins at CMOS driver output 465. CMOS driver output 465 is connected through resistor R25A 344 to transistor input gate 468. Transistor input gate 468 is also connected to GND 364 through resistor R26 348. Transistor input gate 468 is also connected to 6.2 volt zener diode cathode terminal 476. 6.2 volt zener diode anode terminal 478 is connected to GND 364.

Transistor terminal source 470 is connected directly to GND 364. Transistor terminal drain 472 is connected directly to the high/low switch first terminal 352. Transistor terminal drain 472 is also connected to high/low switch second terminal 354 through resistor R29 356. Transistor terminal drain 472 is also connected to GND 364 through capacitor C6 324. Finally, transistor terminal drain 472 is also connected to 15-volt zener diode cathode terminal 475. 15-volt zener diode anode terminal 477 is connected to GND 364 through resistor R27 351. Transformer 480 has a 1:1 winding ratio. Primary winding first terminal 484 is connected to Vcc 374. Primary winding second terminal 486 is connected to the high/low switch pole 353. Secondary winding first terminal 492 and secondary winding second terminal 494 are connected to transmitter terminals (leads are used to connect from these terminals to the target line), 496 and 498, respectively. Secondary winding first terminal 492 is connected directly to LED cathode terminal 497, and secondary winding second terminal is connected directly to LED anode terminal 499.

TABLE A

Summary of TCB Capacitors and Resistors

| Component Name | | Component Value |
|---|---|---|
| C1 | 304 | 0.01 µF |
| C2 | 308 | 0.1 µF |
| C3 | 312 | 0.01 µF |
| C4 | 316 | 0.01 µF |
| C5 | 320 | 10 µF |
| C6 | 324 | 1 µF |
| R7 | 328 | 22 KΩ |
| R8 | 322 | 5600 KΩ |
| R14 | 336 | 110 KΩ |
| R15 | 340 | 2700 KΩ |
| R25 | 344 | 100 Ω |
| R26 | 348 | 33 KΩ |
| R27 | 351 | 2.2 KΩ |
| R29 | 356 | 100 Ω |

TCB 300 is designed so that it will trigger itself and free run as a multivibrator, or in other words, run autonomously as an astable oscillator. TCB 300 has pulse generation circuit 380 and tone generation circuit 420. Capacitor C1 304 charges through resistor R15 340 and resistor R8 332 and discharges through resistor R15 340. Therefore, the duty cycle may be set precisely by the ratio of resistor R15 340 and resistor R8 332. Capacitor C1 304 charges between ⅓ Vcc 374 and ⅔ Vcc 374. TCB 300 is designed so that the period of the output signal is a function of resistor R15 340, resistor R8 332 and capacitor C1 304, and so that the duty cycle of the output signal is a function of only resistor R15 340 and resistor R8 332. Pulse generation circuit 380 has been designed to perform at a base frequency of 1.3 Hertz, with a 75% duty cycle. Tone generation circuit 420 has been designed to perform at a base frequency of 600 Hertz with a 50% duty cycle. Tone/pulse switch 400 selects between tone and pulse mode.

In tone mode, reset control line 428 of tone generation circuit 420 is connected to Vcc 374. Therefore, tone generation circuit 420 activates continuously and the output of transmitter 200 will be a square wave with a frequency of 600 Hz and a 50% duty cycle. Output 438 of tone generation circuit 420 is coupled to non inverting CMOS driver 464 and then to transistor 466. Transistor 466 is an N-channel enhancement Metal Oxide Field Effect Transistor (N-channel enhancement-MOSFET). Transistor 466 functions as a current switch. High/low switch 350 is used to control the transmitter energy provided to the target line. Control of transmitter energy provided to the target line is accomplished either by connecting primary winding 482, through high/low switch 350 to transistor 466, in high mode, or through resistor R29 356, in low mode. Transformer 480 insures connectivity to cable 80 (FIG. 1). Inductive flyback voltage protection is provided by 15.0 volt zener diode 473.

The output of second 555 timer 422 is not intended to source significant current. Therefore, non-inverting CMOS driver 464 is used to interface second signal output 438 of second 555 timer 422 to transistor input gate 468 through R25 344. The function of transistor 466 is to connect, or disconnect, primary winding 482 of transformer 480 to GND 364. When connection is made between primary winding 482 and GND 364, current is forced through primary winding 482 and transformer 480 is considered switched "on". When primary winding 482 is disconnected from GND 364, no current is forced through primary winding 482 and the transformer is considered to be switched "off". Thus, transistor 466 essentially switches transformer 480 on and off.

In pulse mode, reset line 428 of tone generation circuit 420 is connected to output 398 of pulse generation circuit 380 activating tone generation circuit 420 only when pulse generation circuit 380 is high (12 Volts). Output of transmitter 20 will alternate between a square wave with a frequency of 600 Hz and a 50% duty cycle and 0 Volts. Output 438 of tone generation circuit 420 remains coupled to non-inverting CMOS driver 464 and then to transistor 466. Transistor 466 functions as a current switch. High/low switch 350 is used to control the transmitter energy provided to the target line by either connecting primary winding 482 through high/low switch 350 to transistor 466, in high mode, or through resistor R29 356, in low mode. Inductive flyback voltage protection is provided by 15.0 volt zener diode 473.

Figure 7:
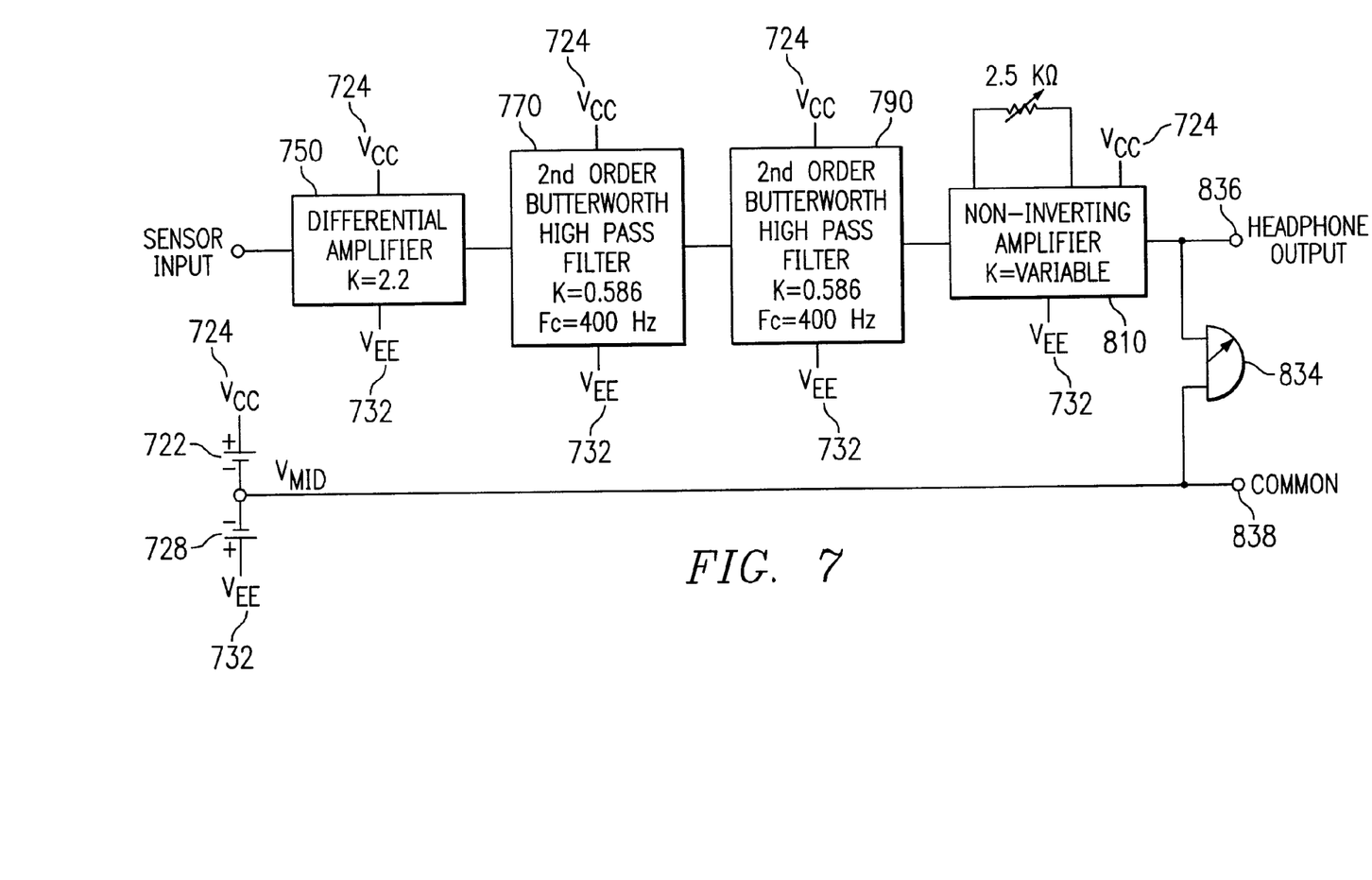
FIG. 7 is a functional block diagram of the detector circuit board.

Referring to FIG. 7, Detector Circuit Board (DCB) 700 is made up of seven components: circuit voltage source 720, wound coil sensor 740, difference amplifier 750, first high pass filter 770, second high pass filter 790, non-inverting amplifier 810. DCB 700 acquires an input signal from coil 132 (See FIG. 4B. Coil 132 is the same as wound coil sensor 740) located in lower housing 126. The input signal is amplified using difference amplifier 750, filtered using a first high pass filter 770 and a second high pass filter 790 and amplified using non-inverting amplifier 810.

Figure 8:
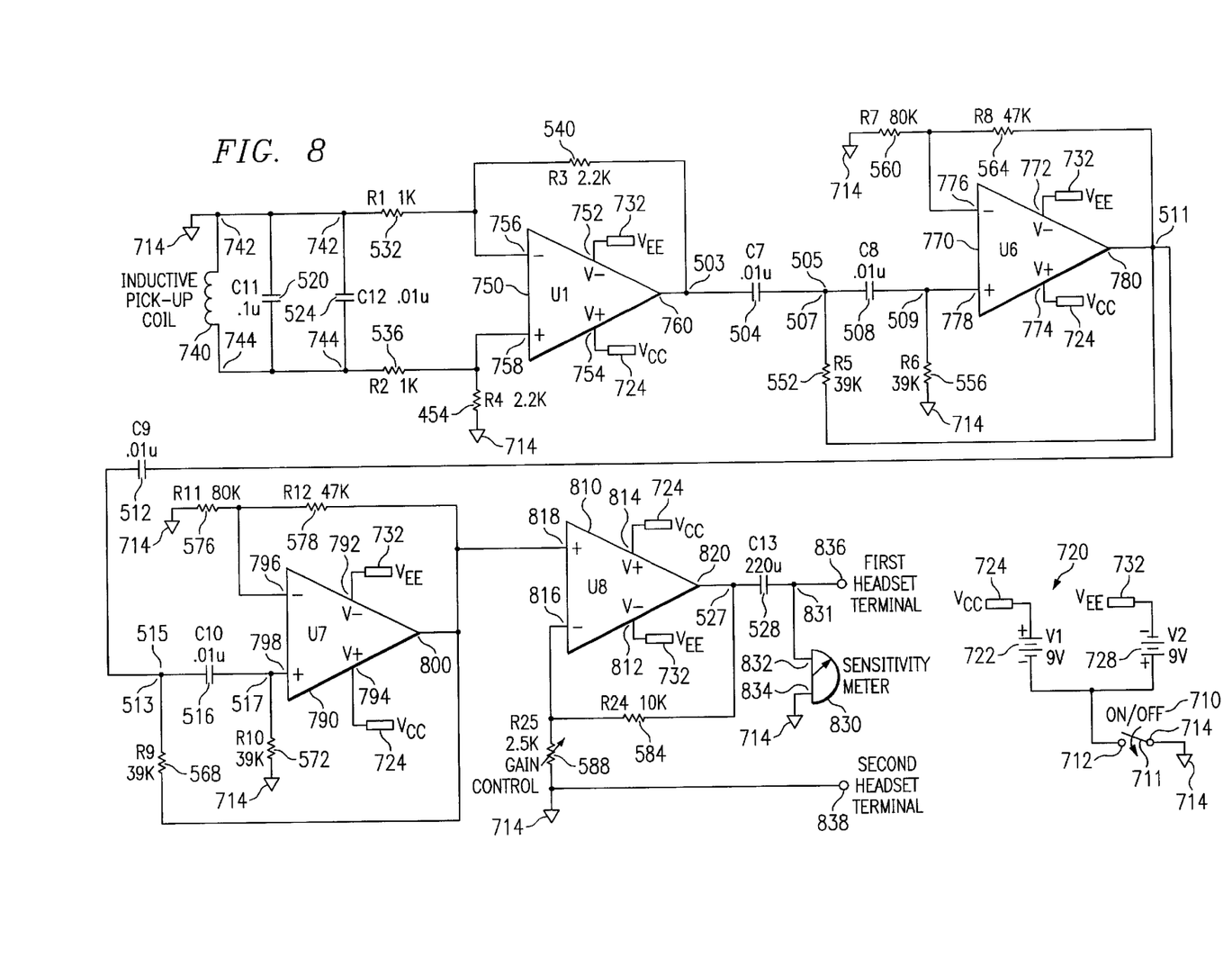
FIG. 8 is a schematic of the detector circuit board.

Referring to FIG. 8, circuit voltage source 720 is implemented using two 9-volt dc batteries, first 9V battery 722 and second 9V battery 728, that are connected according to the following description. First battery positive terminal shall be referred to as Vcc 724, and second battery negative terminal shall be referred to as Vee 732. First battery negative terminal 726 is connected to second battery positive terminal 730 by connection 734. Connection 734 is connected to detector on/off switch first terminal 712. Detector on/off switch second terminal shall be referred to as detector GND 714 herein. In this configuration, circuit voltage source 720 provides three relative voltage potentials: +9 volts, 0 volts, and −9 volts.

Difference amplifer 750, first high pass filter 770, second high pass filter 790 and non-inverting amplifier 810 require Vcc 724 and Vee 732 for full functionality. First high pass filter 770 and second high pass filter 790 are designed for a cutoff frequency of 400 hertz and a DC gain of 0.586 V/V. Output voltage from second high pass filter 790 is further amplified through non-inverting amplifier 810. Non inverting amplifier 810 has potentiometer, resistor R25B 588, so that the user can control the adjustable gain. Combined circuit performance of first high pass filter 770 and second high pass filter 790 operating in conjunction with difference amplifier 750 and non-inverting amplifier 810 provide a cutoff frequency of approximately 400 Hz and an adjustable gain with a minimum of 2.7.

Output of DCB 700 is accomplished through two means. Primary output to a user requires attachment of accessory headphone 112 (FIG. 1) through input jack (FIG. 11) or female RCA jack 118 (FIG. 4C). Output volume of headphones 118 is directly related to the proximity of the target pipe. Secondary output of detector circuit 700 is accomplished through visual inspection of gauge 116. When transmitter 20 is in pulse mode operation, output of detector 100 to headphones 118 (FIG. 1) will be bursts of 600 Hz tone with 50% duty cycle at a pulse frequency of 1.3 Hertz.

Wound coil sensor 740 has wound coil first terminal 742 connected directly to detector GND 714. Capacitor C11 520 and capacitor C12 524, are connected across wound coil first terminal 742 and wound coil second terminal 744.

Difference amplifier 750 is made by configuring an operational amplifier as a difference amplifier. This configuration is implemented as follows. The operational amplifier has four input terminals and one output terminal. Difference amplifier input Vsource− 752 is connected directly to Vee 732. Difference amplifier input Vsource+ 754 is connected directly to Vcc 724. Difference amplifier input Vin− 756 is connected to wound coil first terminal 742 through resistor R1 532. Difference amplifier input Vin+ 758 is connected to wound coil second terminal 744 through resistor R2 536. Also, difference amplifier input Vin+ 758 is connected to detector GND 714 through resistor R4 454. Difference amplifier output Vout 760 is connected to difference amplifier Vin− 756 through resistor R3 540. Also, difference amplifier Vout 760 is connected to first terminal 503 of capacitor C7 504.

First high-pass filter 770 is made from an operational amplifier configured as a second order Butterworth high-pass filter. This configuration is implemented as follows. The operational amplifier has four input terminals and one output terminal. First high pass input Vsource− 772 is connected directly to Vee 732. First high pass input Vsource+ 774 is connected directly to Vcc 724. First high pass input Vin− 776 is connected to detector GND 714 through resistor R7 560. First high pass input Vin+ 778 is connected to detector GND 714 through resistor R6 556. Also, the first high pass input Vin+ 778 is connected to second terminal 509 of capacitor C8 508. First terminal 507 of capacitor C8 508 is connected to second terminal 509 of capacitor C7 504. First high pass Vout 780 is connected through R5 552 to the connection between capacitor C7 504 and capacitor C8 508 (i.e., at second terminal 505 of capacitor C7 504 and first terminal 507 of capacitor C8 508). First high pass output Vout 780 is connected to first terminal 511 of capacitor C9 512. Finally, first high pass output Vout 780 is connected to first high pass input Vin− 776 through R8 564.

Second high-pass filter 790 is made from an operational amplifier configured as a second order Butterworth high-pass filter. This configuration is implemented as follows. Second high-pass filter 790 has four input terminals and one output terminal. Second high pass input Vsource− 792 is connected directly to Vee 732. Second high pass Input Vsource+ 794 is connected directly to Vcc 724. Second high pass input Vin− 796 is connected to detector GND 714 through resistor R11 576. Second high pass input Vin+ 798 is connected to detector GND 714 through resistor R10 572. Also, second high pass input Vin+ 798 is connected to second terminal 517 of capacitor C10 516. First terminal 515 of capacitor C10 516 is connected to second terminal 513 of capacitor C9 512. Second high pass output Vout 800 is connected through R9 568 to the connection between capacitor C9 512 and capacitor C10 516 (i.e., at second terminal 513 of capacitor C9 512 and first terminal 515 of capacitor C10 516). Second high pass output Vout 800 is connected to second high pass input Vin− 796 through R12 578. Finally, second high pass Vout 800 is connected to non-inverting amplifier input Vin+ 818 of non-inverting amplifier 810.

Non-inverting amplifier 810 is comprised of an operational amplifier configured as a non-inverting amplifier. This configuration is implemented as follows. The operational amplifier has four input terminals and one output terminal. Non-inverting amplifier input Vsource− 812 is connected directly to Vee 732. Non-inverting amplifier input Vsource+ 814 is connected directly to Vcc 724. Non-inverting amplifier input Vin− 816 is connected to detector GND 714 through resistor R25 588 (potentiometer). Non-inverting amplifier output Vout 820 is connected to non-inverting amplifier input Vin− 816 through resistor R24 584. Also, non-inverting amplifier output Vout 820 is connected to first terminal 527 of capacitor C13 528.

Sensitivity meter 830 has first sensitivity meter terminal 832 and second sensitivity meter terminal 834. First sensitivity meter terminal 832 is connected to second terminal 832 of capacitor C13 528. Also connected to second terminal 823 capacitor C13 528 is first headset terminal 836. Second sensitivity meter terminal 834 is connected directly to detector GND 714. Second headset terminal 838 is connected directly to detector GND 714.

TABLE B

Summary of DCB Capacitors and Resistors

| Component Name | | Component Value |
|---|---|---|
| C7 | 504 | 0.01 μF |
| C8 | 508 | 0.01 μF |
| C9 | 512 | 0.01 μF |
| C10 | 516 | 0.01 μF |
| C11 | 520 | 0.1 μF |
| C12 | 524 | 0.01 μF |
| C13 | 528 | 220 μF |
| R1 | 532 | 1 KΩ |
| R2 | 536 | 1 KΩ |
| R3 | 540 | 2.2 KΩ |
| R4 | 454 | 2.2 KΩ |
| R5 | 552 | 39 KΩ |
| R6 | 556 | 39 KΩ |
| R7 | 560 | 80 KΩ |
| R8 | 564 | 47 KΩ |
| R9 | 568 | 39 KΩ |
| R10 | 572 | 39 KΩ |
| R11 | 576 | 80 KΩ |
| R12 | 578 | 47 KΩ |
| R24 | 584 | 10 KΩ |
| R25B | 588 | 0–2.5 KΩ adjustable |

Difference amplifier 750 produced a voltage gain of 2. Non-inverting amplifier 810 produces a minimum voltage gain of 5. Resistor R25B 588 is a potentiometer that can range in value from 0 Ω to 2.5 KΩ; therefore, output of non-inverting amplifier 810 can theoretically range from ±9 volts to 5 times the input voltage (not to exceed ±9 volts). Sensitivity meter 830 provides a measure of non-inverting amplifier 810 output voltage. First high-pass filter 770 and second high-pass filter 790 are both second-order Butterworth high-pass filters and designed identically to have a low-frequency cutoff of 400 Hz. When cascaded together, as in detector circuit 700, the low-frequency cutoff of the resulting fourth-order filter is slightly higher than 400 Hz. It should be noted that this slight deviation does not present a problem in the filter's operation.

The incorporation of two second-order Butterworth high-pass filters into DCB 700 achieves an attenuation of frequencies from 0 Hz to 400 Hz that is 80 dB/decade. At the filter output, input signals associated with household electrical power (specifically those operating at 60 Hz) are reduced by more than 10 times.

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed:

1. A line tracer comprising:
   a transmitter having a transmitter circuit board providing a pulse frequency of approximately 1.3 Hz and a tone rate of approximately 600 Hz;
   at least two cables for connecting said transmitter to a target line, said target line being located beneath a surface;
   a detector having a detector circuit board providing an attenuation of approximately 80 dB/decade in frequencies from 0 Hz to 400 Hz;
   wherein said transmitter transmits an electrical signal through said target line and said detector detects said electrical signal in said target line; and
   wherein the location of said target line is determined without penetrating said surface.

2. The line tracer of claim 1 wherein said transmitter circuit board further comprises a pulse generation circuit.

3. The line tracer of claim 1 wherein said transmitter circuit board further comprises a tone generation circuit.

4. The line tracer of claim 1 wherein said transmitter circuit board further comprises a transformer drive circuit.

5. The line tracer of claim 1 wherein said detector circuit board further comprises a difference amplifier means for producing a voltage gain of 2.

6. The line tracer of claim 1 wherein said detector circuit board further comprises a means for producing a cut off frequency of 400 Hz and an 80 db/decade attenuation of signals below 400 Hz.

7. The line tracer of claim 1 wherein said detector circuit board further comprises a non-inverting amplifier means for producing a voltage gain of 5.

8. The line tracer of claim 1 wherein said detector circuit board further comprises a sensitivity meter.

9. The line tracer of claim 1 further comprising a high/low switch connected to said transmitter circuit board.

10. The line tracer of claim 1 further comprising a tone/pulse switch connected to said transmitter circuit board.

11. The line tracer of claim 1 further comprising a transistor and a non-inverting CMOS driver connected to a transformer and to said transmitter circuit board.

12. The line tracer of claim 1 wherein the transmitter circuit board comprises:
   a circuit voltage source;
   means for providing an astable multi-vibrator; and
   wherein said transmitter circuit board transmits an electrical signal through a line which may be detected by a detector having a detector circuit board providing an attenuation of approximately 80 dB/decade in frequencies from 0 Hz to 400 Hz.

13. The transmitter circuit board of claim 12 further comprising:
   means for generating a pulse signal at 1.3 Hz with a 75% duty cycle; and
   means for generating a tone signal at 600 Hz with a 50% duty cycle.

14. The transmitter circuit board of claim 12 further comprising a transistor means for controlling a transformer.

15. The improved transmitter circuit board of claim 12 further comprising a means for providing inductive flyback voltage protection.

16. The line tracer of claim 1 wherein the detector circuit board comprises:
   a circuit voltage source;
   a wound coil sensor
   a means for amplifying an input signal;
   a means for providing a low frequency cutoff of approximately 400 Hz;
   a means for amplifying an output signal; and
   wherein said detector circuit board, when coupled with a detector, is capable of detecting an electrical signal in a line.

17. The line tracer of claim 1 wherein said cables are removably connected to said target line and are removably connectable to a plurality of different said target lines.

18. The line tracer of claim 1 wherein said line tracer can distinguish said target line from at least one non-target line, wherein said non-target line is proximately located to said target line.

19. The line tracer of claim 1 wherein said target line is located using only one tone.

20. A method of determining the location of a hidden water pipe comprising:
   using a line tracer, performing the following steps:
      determining a line to be traced, said line being located under a surface;
      choosing a connecting point on each end of said line;
      connecting a transmitter output line to a first end of said line;
      connecting a transmitter input line to a second end of said line;
      transmitting a signal at a tone rate of approximately 600 Hz;
      passing a detector back and forth over a search area;
      responsive to receiving an audible tone from said detector, monitoring a gauge on said detector;
      responsive to said gauge, determining the location of the highest amplitude of signal strength;
      responsive to determining the location of the highest amplitude of signal strength, marking a point on the line;
   wherein said transmitter transmits an electrical signal through said line and said detector detects said electrical signal in said line; and
   wherein the location of said target line is determined without penetrating said surface.

21. The method of claim 20 further comprising:
   transmitting a pulse signal at a frequency of approximately 1.3 Hz.

22. The method of claim 20 wherein said input line and said output line are removably connected to said line and are removably connectable to a plurality of different said lines.

23. The method claim 20 wherein said line is a target line; wherein said line tracer can distinguish said target line from at least one non-target line; and wherein said non-target line is proximately located to said target line.

24. The method of claim 20 wherein said line tracer locates said target line using only one tone.

* * * * *